United States Patent
Chukka (10) Patent No.: US 12,231,211 B2
(45) Date of Patent: Feb. 18, 2025

(54) mmWAVE 5G PROPAGATION USING INTER-SECTOR BEAMSETS

(71) Applicant: T-MOBILE INNOVATIONS LLC, Overland Park, KS (US)

(72) Inventor: Chaitanya Chukka, Carol Stream, IL (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/080,521

(22) Filed: Dec. 13, 2022

(65) Prior Publication Data

US 2024/0195484 A1    Jun. 13, 2024

(51) Int. Cl.
*H04L 23/02*    (2006.01)
*H04B 7/08*    (2006.01)

(52) U.S. Cl.
CPC .............. *H04B 7/086* (2013.01); *H04B 7/088* (2013.01)

(58) Field of Classification Search
CPC ... H04W 24/08; H04W 52/146; H04W 16/28; H04W 36/32; H04W 48/12; H04W 52/143; H04L 41/12; H04L 5/0073; H04L 1/0026; H04B 7/0413; H04B 7/0617; H04B 17/309; H04B 7/0456
USPC ........................................ 375/262, 260, 267
See application file for complete search history.

(56) References Cited

U.S. PATENT DOCUMENTS

| | | | |
|---|---|---|---|
| 9,369,161 B1 | 6/2016 | Chukka et al. | |
| 9,407,382 B1 | 8/2016 | Chukka et al. | |
| 9,439,092 B1 | 9/2016 | Chukka et al. | |
| 9,521,580 B1 | 12/2016 | Wurtenberger et al. | |
| 9,705,177 B1 | 7/2017 | Schmidt et al. | |
| 9,806,413 B1 | 10/2017 | Chukka et al. | |
| 9,893,759 B1 | 2/2018 | Chukka et al. | |
| 10,165,451 B1 | 12/2018 | Chukka et al. | |
| 10,630,395 B1 | 4/2020 | Chukka | |
| 10,985,456 B1 | 4/2021 | Chukka et al. | |
| 11,129,069 B1 | 9/2021 | Marupaduga | |
| 11,825,500 B1* | 11/2023 | Shvodian | H04W 72/541 |
| 2017/0181156 A1* | 6/2017 | Nguyen | H04W 76/15 |
| 2020/0244338 A1 | 7/2020 | Raghavan et al. | |
| 2022/0021439 A1* | 1/2022 | Vivanco | H04B 7/18506 |

(Continued)

*Primary Examiner* — Khai Tran
(74) *Attorney, Agent, or Firm* — Shook, Hardy & Bacon L.L.P.

(57) ABSTRACT

Methods, media, and systems are provided for improving beamset management and enhancing coverage in a wireless telecommunication network utilizing millimeter wave (mm-Wave) communications. The wireless telecommunication network can correspond to an urban area, for example. As one example, the technology disclosed herein can reduce dropped call rates within the wireless telecommunication network. In embodiments, sector metrics are received for one or more sectors of the wireless telecommunication network and stored at a primary-secondary cell and a special cell of at least one of the sectors of the wireless telecommunication network. A beamset (or at least one parameter thereof) corresponding to a sector is changed based on the sector metrics stored at the primary-secondary cell and the special cell. The sector metrics include beamset data (e.g., beamset data corresponding to an alpha sector of the one or more sectors of the wireless telecommunication network).

17 Claims, 5 Drawing Sheets

(56) References Cited

U.S. PATENT DOCUMENTS

2022/0264311 A1\* 8/2022 Mondal ................ H04W 24/02
2024/0031865 A1\* 1/2024 Ozozlu ............. H04W 28/0958

\* cited by examiner

# mmWAVE 5G PROPAGATION USING INTER-SECTOR BEAMSETS

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to technology associated with millimeter wave (mmWave) propagation and applying changes to beamsets, substantially as shown in and/or described in connection with at least one of the figures, and as set forth more completely in the claims.

In aspects set forth herein, and at a high level, the technology described herein relates to sector beamset management in a wireless telecommunication network utilizing mmWave communication. In embodiments, at least one sector metric is received for a first sector of a coverage area of the wireless telecommunication network utilizing mmWave communication. For example, sector metrics may include, sector loading data (e.g., loading patterns), time domain, frequency domain, power domain technique data, sector carrier data, time slots, transmit power levels, SINR associated with carriers and sectors, sector and carrier mappings to data rates, sector location data, one or more radio frequency environments of a sector, sector-edge location data, sector interference data, other types of sector metrics, or one or more combinations thereof. The at least one sector metric includes beamset data corresponding to the first sector.

The first sector refers to a portion of the coverage area. A "beamset" includes a pair of beams or more than two beams, for example. Beamset data can include synchronization signals, reference signals, beam selection signals, other control signals, beamforming weight sets, vertical beam width, azimuthal beam width, channel state information, electrical tilt, associated antenna characteristics other types of beamforming signals, or one or more combinations thereof. Beamsets can be generated by combining signals communicated by antenna elements of an antenna or an antenna array corresponding to one or more cell sites, satellites, user devices, other beamforming devices, or one or more combinations thereof. Beamsets can be utilized for downlink channels such as physical downlink control channels and physical downlink shared channels, for example. Beamsets can also be utilized for uplink channels such as physical uplink control channels and physical uplink shared channels, for example.

The sector metrics received can be stored at a primary-secondary cell and a special cell of a second sector that includes a different portion of the coverage area than the first sector. In some embodiments, the first sector and the second sector have an overlapping portion within the coverage area. In some embodiments, sector metrics for a third sector of the coverage area are received and stored at the primary-secondary cell and the special cell of the second sector. In some embodiments, sector metrics for the second sector and the third sector are also stored at a primary-secondary cell and special cell of the first sector. In some embodiments, sector metrics for the first sector and the second sector are also stored at a primary-secondary cell and special cell of the third sector.

Antenna elements corresponding to the coverage area can change a beamset corresponding to one or more of the first sector, second sector, third sector, or one or more combinations thereof, based on the beamset data stored at the primary-secondary cell and the special cell of the respective sector. For example, the antenna elements may change a frequency range corresponding to one or more beams of the beamset (e.g., from a sub-6 GHz band to an mmWave band or from a first mmWave band to a second mmWave band). In some embodiments, the change to the beamset may be based on applying one or more machine learning algorithms to the sector metrics received. In some embodiments, the change to the beamset may be based on one of the sectors having a stronger signal than another sector within an overlapping portion corresponding to these two sectors.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
CD-ROM Compact Disk Read Only Memory
CDMA Code Division Multiple Access
eNB Evolved Node B
FDD Frequency Division Duplex
gNB Next Generation Node B
GPRS General Packet Radio Service
GSM Global System for Mobile communications
DVD Digital Versatile Discs
EEPROM Electrically Erasable Programmable Read Only Memory
E-UTRA Evolved Universal Terrestrial Radio Access
FD-MIMO Full-Dimension Multiple-Input Multiple-Output
IoT Internet of Things
LTE Long Term Evolution
MIMO Multiple-Input Multiple-Output
MME Mobility Management Entity
mmWave Millimeter waves
MU-MIMO Multi-User Multiple-Input Multiple-Output
NR New Radio
PC Personal Computer
PDA Personal Digital Assistant
PDCCH Physical Downlink Control Channel
PDSCH Physical Downlink Shared Channel
PUCCH Physical Uplink Control Channel
PUSCH Physical Uplink Shared Channel
RAM Random Access Memory
RF Radio-Frequency
ROM Read Only Memory
RSRP Reference Transmission Receive Power
RSRQ Reference Transmission Receive Quality
RSSI Received Signal Strength Indicator
SINR Signal-to-Interference and Noise Ratio
TDMA Time Division Multiple Access In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more."

The term "combination" (e.g., a combination thereof, combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

The term "mmWave," as used herein, refers to the extremely high frequency band (e.g., from 30 GHz to 300 GHz).

The terms "change" and "adjust" as used herein with respect to beamsets refer to modifying or altering.

Additionally, a "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in an embodiment, similar to user devices 102A-102C described herein with respect to FIG. 1. A user device may also be, in another embodiment, similar to user device 500, described herein with respect to FIG. 5.

A user device may additionally include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or a combination thereof.

In aspects, a user device discussed herein may be configured to communicate using one or more of 4G (e.g., LTE), 5G, 6G, another generation communication system, or a combination thereof. In some aspects, the user device has a radio that connects with a 4G cell site but is not capable of connecting with a higher generation communication system. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

"Wireless telecommunication services" refer to the transfer of information without the use of an electrical conductor as the transferring medium. Wireless telecommunication services may be provided by one or more telecommunication network providers. Wireless telecommunication services may include, but are not limited to, the transfer of information via radio waves (e.g., Bluetooth®), satellite communication, infrared communication, microwave communication, Wi-Fi, mmWave communication, and mobile communication. Embodiments of the present technology may be used with different wireless telecommunication technologies or standards, including, but not limited to, CDMA 1xAdvanced, GPRS, Ev-DO, TDMA, GSM, WiMax technology, LTE, LTE Advanced, other technologies and standards, or a combination thereof.

A "network" providing the wireless telecommunication services may be a telecommunication network(s), or a portion thereof. A telecommunication network might include an array of devices or components (e.g., one or more cell sites). The network can include multiple networks, and the network can be a network of networks. In embodiments, the network is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a network can connect one or more user devices to a corresponding immediate service provider for services such as 5G and LTE, for example. In aspects, the network provides wireless telecommunication services comprising one or more of a voice service, a message service (e.g., SMS messages, MMS messages, instant messaging messages, an EMS service messages), a data service, other types of wireless telecommunication services, or a combination thereof, to user devices or corresponding users that are registered or subscribed to a telecommunication service provider to utilize the one or more services. The network can comprise any communication network providing voice, message, or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, another generation network, or a combination thereof.

Components of the network, such as terminals, links, and nodes (as well as other components), can provide connectivity in various implementations. For example, components of the network may include core network nodes, relay devices, integrated access and backhaul nodes, macro eNBs, small cell eNBs, gNBs, relay cell sites, other network components, or a combination thereof. The network may interface with one or more cell sites through one or more wired or wireless backhauls. As such, the one or more cell sites may communicate to devices via the network or directly. Furthermore, user devices can utilize the network to communicate with other devices (e.g., a user device(s), a server(s), etc.) through the one or more cell sites.

As used herein, the term "cell site" (used for providing UEs with access to the telecommunication services) generally refers to one or more cellular base stations, nodes, RRUs control components, and the like (configured to provide a wireless interface between a wired network and a wirelessly connected user device). A cell site may comprise one or more nodes (e.g., eNB, gNB, and the like) that are configured to communicate with user devices. In some aspects, the cell site may include one or more band pass filters, radios, antenna arrays, power amplifiers, transmitters/receivers, digital signal processors, control electronics, GPS equipment, and the like.

For example, the cell site may refer to a base transceiver station, a radio base station, an access point, a radio transceiver, a NodeB, an eNB, a gNB, a Home NodeB, a Home eNodeB, another type cell site, or one or more combinations thereof. A node corresponding to the cell site may comprise one or more of a macro base station, a small cell or femtocell base station, a relay base station, another type of base station, or one or more combinations thereof. In aspects, the cell site may be configured as FD-MIMO, massive MIMO, MU-MIMO, cooperative MIMO, 3G, 4G, 5G, another generation communication system, or a combination thereof. In addition, the cell site may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior methods and systems have had drawbacks associated with providing communication services using mmWave frequency transmission. For example, in an environment with objects that interfere with mmWave frequency transmissions (e.g., in an urban environment or a forest), signal fading is increased and the quality of the communication service is decreased. For example, at −95 dBm, RSRP measurements indicate that the quality of communication service is decreased within an environment having objects that interfere with the mmWave frequency transmissions. Additionally, these interferences can result in temporary sector outages, thereby further decreasing the quality of the communication service.

The technology provided herein can alleviate the problems discussed above. For example, the technology disclosed herein reduces sector outage and can increase the quality of the communication service (e.g., to −104 dBm or roughly a 9 dBm improvement). For example, in one embodiment, the technology comprises a system for sector beamset management in a wireless telecommunication network utilizing mmWave communication. The system comprises at least one cell site having one or more antennas, the at least one cell site associated with the wireless telecommunication network utilizing the mmWave communication, one or more processors associated with the at least one cell site, and computer memory storing computer-usable instructions that, when executed by the one or more processors, perform operations. The operations may comprise receiving at least one sector metric for a first sector of the wireless telecommunication network utilizing the mmWave communication, wherein the at least one sector metric includes beamset data corresponding to the first sector. The operations also comprise storing the beamset data at a primary-secondary cell and a special cell of a second sector. The operations also comprise causing at least one antenna of the one or more antennas to change a beamset corresponding to the second sector based on the stored beamset data.

In another embodiment, a method for sector beamset management in a wireless telecommunication network utilizing mmWave communication is provided. For example, sector metrics are received for a plurality of sectors of the wireless telecommunication network utilizing the mmWave communication, the sector metrics including beamset data. The sector metrics are stored at a primary-secondary cell and a special cell of one or more of the plurality of sectors. Further the method includes causing at least one antenna of the of the wireless telecommunication network to change a beamset corresponding to the one or more of the plurality of sectors based on the stored sector metrics.

Another embodiment includes one or more non-transitory computer storage media having computer-executable instructions embodied thereon, that when executed by at least one processor, cause the at least one processor to perform a method. The method comprises receiving beamset data for a first sector of a wireless telecommunication network utilizing a millimeter wave (mmWave) communication. The method also comprises storing the beamset data at a primary-secondary cell and a special cell of a second sector of the wireless telecommunication network, wherein the first sector corresponds to a first antenna array and the second sector corresponds to a second antenna array. The method further comprises causing the second antenna array to change a beamset corresponding to the second sector based on the stored beamset data.

Figure 1:
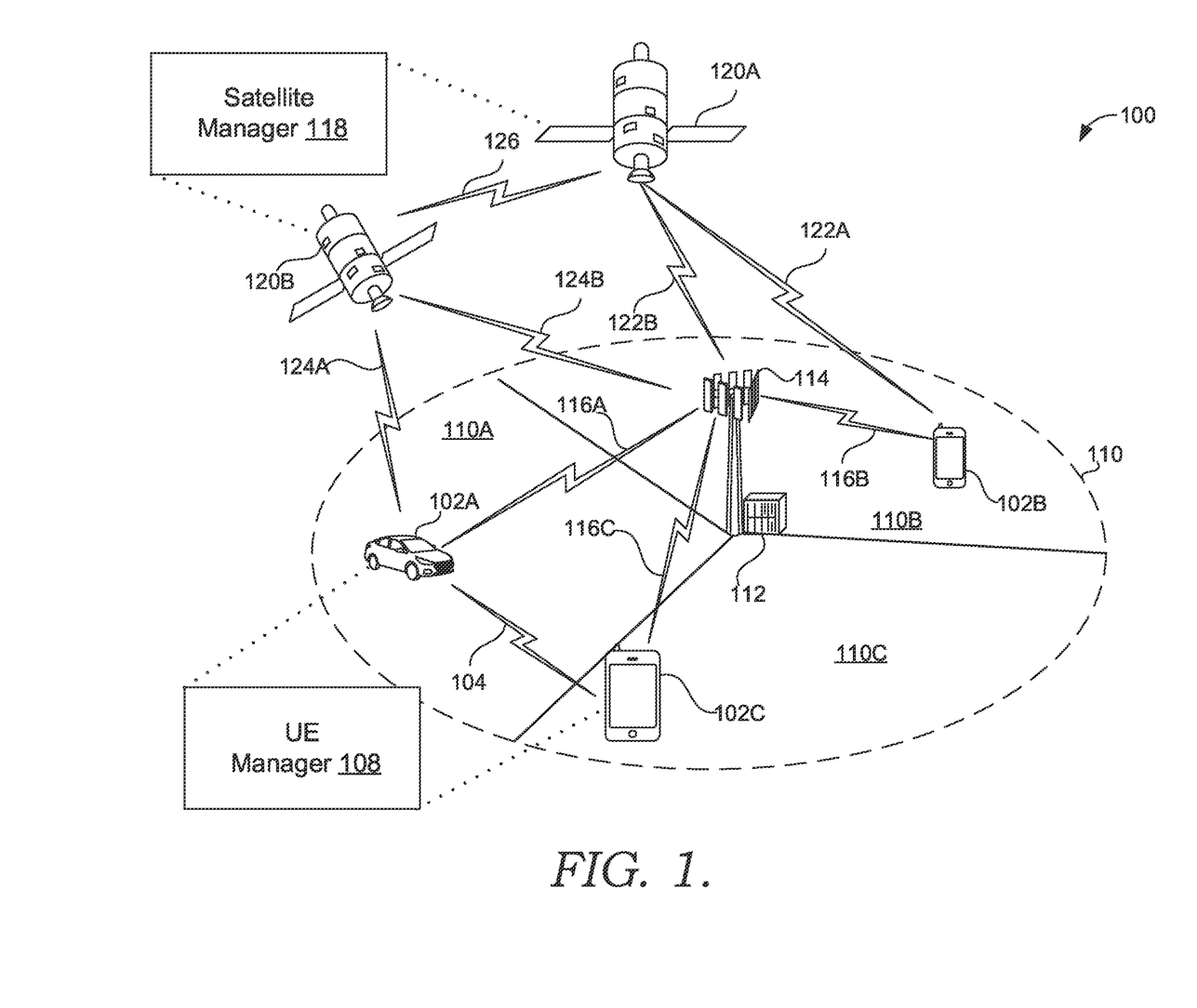
FIG. 1 depicts an example operating environment for sector beamset management in a wireless telecommunication network utilizing millimeter wave (mmWave) communication, in accordance with aspects herein.

Turning now to FIG. 1, example environment 100 supports sector beamset management in a wireless telecommunication network utilizing mmWave communication for improved wireless telecommunications, in accordance with one or more embodiments disclosed herein. Example environment 100 is but one example of a suitable environment for the improved telecommunications disclosed herein, and is not intended to suggest any limitation as to the scope of use or functionality of the invention. Neither should the environment 100 be interpreted as having any dependency or requirement relating to any one or combination of components illustrated.

Example environment 100 includes user devices 102A-102C, communication link 104 between user devices 102A and 102C, UE manager 108, coverage area 110 having sectors 110A, 110B, and 110C, MME 112, cell site 114, communication links 116A-116C associated with the cell site 114, satellite manager 118, satellites 120A and 120B, communication links 122A and 122B associated with satellite 120A, communication links 124A and 124B associated with satellite 120B, and communication link 126 between satellites 120A and 120B.

Example environment 100 may be associated with one or more of a non-terrestrial network, an LTE network, an LTE-A network, an LTE-A Pro network, an NR network, an mmwave network, another type of network, or one or more combinations thereof. In some embodiments, the example environment 100 may support enhanced broadband communications, ultra-reliable (e.g., mission critical) communications, low latency communications, communications with low-cost and low-complexity devices, another type of communication, or one or more combinations thereof.

In embodiments, example environment 100 can utilize both licensed and unlicensed (e.g., the 60 GHz mmWave frequency band) radio frequency bands. For example, the example environment 100 may employ License Assisted Access, LTE-Unlicensed radio access technology, or NR technology in an unlicensed band (e.g., 5 GHz industrial, scientific, and medical band). When operating in unlicensed radio frequency bands, cell sites, satellites, or user devices may employ carrier sensing for collision avoidance and detection. In some examples, operations in unlicensed bands may be based on a carrier aggregation configuration and component carriers operating in a licensed band. Operations in unlicensed spectrum may include downlink transmissions, uplink transmissions, P2P transmissions, D2D transmissions, another type of unlicensed spectrum operation, or one or more combinations thereof.

User devices 102A-102C may wirelessly communicate via one or more wireless telecommunication services provided by one or more cell sites (e.g., cell site 114), one or more satellites (e.g., satellites 120A and 120B), other types of wireless telecommunication devices, or one or more combinations thereof. In example environment 100, cell site 114 and satellites 120A and 120B can provide a coverage area 110 for supporting communication signals according to one or more radio access technologies. Supported communication signals within coverage area 110 can include mmWave communication signals (e.g., from 30 GHz to 300 GHz).

In embodiments, the user devices 102A-102C can be stationary, mobile, or one or more combinations thereof at different times. In embodiments, the user devices 102A-102C may have different capabilities. The user devices 102A-102C can devices in different forms or having different capabilities. The user devices 102A-102C may be able to communicate with various types of devices, such as other UEs, the cell site 114, or network equipment (e.g., core network nodes, relay devices, integrated access and backhaul nodes, other network equipment, or one or more combinations thereof). The user devices 102A-102C are also able to communicate using one or more mmWave frequency bands.

The user devices 102A-102C may include a unit, a station, a terminal, or a client, for example. The user devices 102A-102C may also include a wireless local loop station, an IoT device, an Internet of Everything device, a machine type communication device, an evolved or enhanced machine type communication device, another type of user device, or one or more combinations thereof. The machine type communication device or the evolved or enhanced machine type communication device may include, for example, one or more robots, drones, remote devices, sensors, meters, monitors, location tags, etc., that may communicate with a cell site, another device (e.g., remote device), or some other entity. In some embodiments, user devices 102A-102C may be implemented in various objects such as appliances, or vehicles, meters, and other objects. In some embodiments, the user devices 102A-102C may sometimes act as a relay as well as the cell site 114 and the network equipment including macro eNBs or gNBs, small cell eNBs or gNBs, or relay base stations, for example.

As illustrated in example environment 100, coverage area 110 comprises sector 110A, sector 110B, and sector 110C. In an embodiment, sector 110A is an "alpha" sector (e.g., the sector closest north), sector 110B is a "beta" sector (e.g., the subsequent sector clockwise from the alpha sector), and sector 110C is a "gamma" sector. The term "sector" refers to a portion of a coverage area (e.g., coverage area 110). Each of the alpha, beta, and gamma sectors are each associated with at least one antenna array, in some embodiments. For example, each of the alpha, beta, and gamma sectors are associated with a different antenna array corresponding to the cell site 114. In some embodiments, each of the alpha, beta, and gamma sectors are additionally or alternatively associated with one or more antennas of satellite 120A or 120B. In embodiments, one or more antennas associated with each of the cell site 114 and satellites 120A and 120B cover a 120 degree sector of each of the alpha, beta, and gamma sectors of coverage area 110. In embodiments, each of sectors 110A, 110B, and 110C have one or more frequency bands. In embodiments, each of sectors 110A, 110B, and 110C have one or more mmWave frequency bands.

UE manager 108 can receive sector metrics comprising beamset data from (or transmit sector metrics and beamset data to) user devices 102A-102C, MME 112, cell site 114, satellite manager 118, satellites 120A and 120B, another type of device or other components, or one or more combinations thereof. For example, sector metrics may include, in addition to beamset data, sector loading data (e.g., loading patterns), time domain, frequency domain, power domain technique data, carriers, time slots, transmit power levels, SINR associated with carriers and sectors, sector and carrier mappings to data rates, sector location data, radio frequency environment of a sector, sector-edge location data, sector interference data, scheduling delay data, current radio frequency fingerprint data, historic radio frequency fingerprint data, signal amplitude, signal phase, sector frequencies, pseudo noise phase measurement data detected by a user device, demand magnitude, demand location, service utilization, traffic types, a Neff metric, other types of sector metrics, or one or more combinations thereof.

Cell site 114 may operate in mmWave frequencies, near-mmWave frequencies (e.g., extending down to a frequency of 3 GHz with a wavelength of 100 millimeters) in communication with one or more of user devices, or one or more combinations thereof. The mmWave cell site 114 may utilize beamforming with the user devices within coverage area 110. In embodiments, cell site 114 can transmit using mmWave or near-mmWave and beamforming. In some embodiments, cell site 114 may be movable and therefore provide communication coverage for a moving geographic coverage area 110.

In embodiments, cell site 114 can also be configured to operate according to 3G, 4G, 5G, another generation communication system, or one or more combinations thereof. For instance, the cell site 114 could be an LTE eNB or a 5G NR gNB, among other possibilities. In embodiments, cell site 114 may be equipped with multiple antennas, which may be used to employ techniques such as transmit diversity, receive diversity, MIMO communications (e.g., FD-MIMO, massive MIMO, MU-MIMO, cooperative MIMO), beamforming, other techniques, or one or more combinations thereof. In some embodiments, one or more cell site antennas or antenna arrays may be co-located at an antenna assembly, such as an antenna tower. In some examples, antennas or antenna arrays associated with cell site 114 may be located in diverse geographic locations. In some aspects, one or more nodes corresponding to cell site 114 may comprise one or more macro cells, one or more small cells, one or more relay base stations, one or more repeaters, one or more femtocells, other types of cells, or one or more combinations thereof.

Cell site 114 may communicate with the wireless telecommunication network via a core network, one or more other cell sites, one or more satellites, or one or more combinations thereof, over one or more backhaul links (e.g., via an X2, Xn, or other interface) either directly (e.g., directly between cell sites), or indirectly (e.g., via core network), or one or more combinations thereof. The backhaul links may be or include one or more wireless links, for example. The core network can provide user authentication, access authorization, tracking, Internet Protocol connectivity, other types of access, routing, or mobility functions, or one or more combinations thereof. Core network can be an evolved packet core, a 5G core, another type of core network, or one or more combinations thereof. The network of example environment 100 includes MME 112. In some embodiments, MME 112 can be or include a user device, a server, or one or more combinations thereof. The MME 112 can perform operations comprising receiving sector metrics for a plurality of sectors (e.g., sectors 110A, 110B, and 110C) of the wireless telecommunication network utilizing the mmWave communications in example environment 100. Further, MME 112 can perform operations comprising storing the sector metrics at a primary-secondary cell and a special cell of one or more of the plurality of sectors (e.g., sectors 110A, 110B, and 110C).

Satellites 120A and 120B may communicate with cell site 114 and user devices 102A-102C (or other high altitude or terrestrial communications devices, for example). "Satellite" is also referred to as a space vehicle or communication satellite. Satellites 120A and 120B may be any suitable type of communication satellite configured to relay communications between different end nodes in a wireless communication system. Satellites 120A and 120B may be or include a space satellite, a balloon, a dirigible, an airplane, a drone, an unmanned aerial vehicle, another type of satellite, or one or more combinations thereof. In some examples, the satellites 120A and 120B may be in a geosynchronous or geostationary earth orbit, a low earth orbit, a medium earth orbit, another type of orbit, or one or more combinations thereof. In some embodiments, satellites 120A and 120B may be a multi-beam satellite configured to provide service for multiple service beam coverage areas in a predefined geographical service area (e.g., coverage area 110). The satellites 120A and 120B may be any distance away from the surface of the earth.

In some embodiments, satellites 120A and 120B may be deployed at an altitude of 18 km to 25 km (e.g., a geostationary balloon satellite), wherein the stratosphere has low wind speeds (e.g., 5 m/s to 40 m/s) and low turbulence. In this example, satellites 120A and 120B may be configured to communicate via communication link 126. As such, the communication link 126 may include a free space optical link, a microwave link, electromagnetic wave signals via mmWaves, optical signals via a laser, another type of communication link, or one or more combinations thereof. Continuing the example, satellites 120A and 120B may be configured to communicate via a wireless common public radio interface protocol, a dedicated wireless front haul protocol developed for high-altitude-to-high-altitude, another protocol, or one or more combinations thereof.

In some embodiments, a cell may be provided or established by satellites 120A and 120B as part of a non-terrestrial network. Satellites 120A and 120B may, in some cases, perform the functions of cell site 114, act as a bent-pipe satellite, act as a regenerative satellite, act as another type of satellite, or one or more combinations thereof. In other cases, satellites 120A and 120B may be a smart satellite, or a satellite with intelligence. For example, a smart satellite may be configured to perform more functions than a regenerative satellite (e.g., may be configured to perform particular algorithms beyond those used in regenerative satellites or to be reprogrammed, for example). A bent-pipe transponder or satellite may be configured to receive signals from ground cell sites (e.g., cell site 114) and transmit those signals to different ground cell sites. In some embodiments, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, another type of satellite or regenerative transponder function, or one or more combinations thereof. For example, a bent-pipe satellite may receive a signal from a cell site and may relay the signal to a user device or cell site, or vice-versa. As such, the sector metrics corresponding to the 120A and 120B may include, for example, the particular algorithms, amplified signal data, shift data corresponding to the shift from uplink frequencies to downlink frequencies, relay signal data, demodulation data, re-encoding data, other types of functional data, or one or more combinations thereof.

User devices 102A-102C may communicate with satellites 120A and 120B using communications links 122A and 124A, for example. In some embodiments, timing adjustments may be used to account for propagation delays associated with communications links 122A and 124A, propagation delays associated with communication links 116A-116C between one of the user devices 102A-102C and the cell site 114, propagation delays associated with communication links 122B and 124B between cell site 114 and satellites 120A and 120B, as well as a variation in the propagation delays due to movement of the satellites 120A and 120B. For example user devices 102A-102C may account for variation in propagation delay when determining an uplink timing for uplink communications via one or more of satellites 120A and 120B. As such, the sector metrics corresponding to the 120A and 120B may include, for example, the timing adjustment data, propagation delay data, uplink timing data, other types of functional data, or one or more combinations thereof.

Satellites 120A and 120B may have one or more antennas, which may be used to employ techniques including transmit diversity, receive diversity, MIMO communications, mmWave communications, beamforming, mmWave beamforming, other types of techniques, or one or more combinations thereof. These MIMO communications may employ multipath signal propagation to increase the spectral efficiency by transmitting or receiving multiple signals via different spatial layers, which may be referred to as spatial multiplexing. Further, these techniques may be employed by the one or more antennas of the satellites 120A or 120B via different antennas or different combinations of antennas, for example. Different spatial layers may be associated with different antenna ports used for channel measurement and reporting. As such, the sector metrics corresponding to the 120A and 120B may include, for example, spatial layer data, antenna combination data, channel measurement data, other types of spatial multiplexing data, or one or more combinations thereof.

Further, satellites 120A and 120 can shape or steer one or more beams of a beamset along a spatial path between the respective satellite and a user device, for example. Beamforming can be implemented by combining signals communicated by the satellite antenna elements of an antenna array, such that signals propagating at an orientation associated with the antenna array are adjusted by an amplitude offset or a phase offset associated with a constructive or destructive interference. The amplitude offset and phase offset may be associated with a beamforming weight. In some embodiments, a plurality of antenna arrays of the satellites 120A or 120B conduct beamforming operations by transmitting signals (e.g., synchronization signals, reference signals, beam selection signals, other control signals, other types of beamforming signals, or one or more combinations thereof) multiple times in different directions. For example, an antenna array of at least one of the satellites 120A or 120B can transmit a signal according to different beamforming weight sets associated with different directions of transmission.

This beamset data (e.g., propagating signal orientation data, amplitude offset data, phase offset data, constructive interference data, destructive interference data, beamforming weight, synchronization signals, reference signals, beam selection signals, other control signals, other beamset data, or one or more combinations thereof) can be used to identify a beam direction for subsequent transmissions or for reception of the beam (e.g., by user devices 102A-102C). Further, this beamset data can be used to change a beamset corresponding to one or more of sectors 110A, 110B, or 110C.

A beamset can include a pair of beams or more than two beams, for example. A beamset can carry uplink signals, downlink signals, control signals and channels, data signals and channels, or one or more combinations thereof. The beamset data corresponding to the control signals and channels and the data signals and channels, may include PDSCH, PDCCH, PUSCH, PUCCH, or one or more combinations thereof. As such, in addition to the beamset data including the synchronization signals, reference signals, beam selection signals, other control signals, beamforming weight sets, beam direction, other types of beamforming signals, or one or more combinations thereof; beamset data may also correspond to uplink signals, downlink signals, control signals and channels, data signals and channels, or one or more combinations thereof.

Additionally, beamset data reported by user devices 102A-102C or other devices can include measurement reference signals, channel state information reference signals, primary synchronization signals, secondary synchronization signals, channel quality associated with a beam sweep, other types of beamset data, or one or more combinations thereof. Beamset data generated from cell site 114 and satellites 120A and 120B can include a target beam identifier; a beamset switch time associated subframes, slots, mini-slots (e.g., specifying a subframe, slot, or mini-slot identifier or an offset); channel quality associated with a beam sweep; a number of user devices associated with a sector of a coverage area (e.g., sectors 110A, 110B, and 110C of coverage area 110); a number of user devices associated with a beamset corresponding to a sector; a number of user devices associated with a beam of a beamset; analog or digital beamforming capabilities; beamforming type; other timing information; other beamforming configuration data; other beamset data; or one or more combinations thereof.

In embodiments, cell site 114 and satellites 120A and 120B can each transmit beams corresponding to beamsets in a plurality of spatial directions. As such, user devices 102A-102C can perform beam sweeps with the cell site 114 or at least one of satellites 120A and 120B, wherein the beam sweeps correspond to an mmWave frequency range. In some embodiments, user devices 102A-102C can transmit one or more beams in a plurality of different spatial directions and the cell site 114 and satellites 120A and 120B can listen or scan for the beam transmissions. Each of the beamsets and the beams of each beamset being transmitted can correspond to one or more of the sectors 110A, 110B, and 110C of coverage area 110.

Satellite manager 118 can receive, manage, and store data received by satellites 120A and 120B, cell site 114, MME 112, and UE manager 108. For example, the satellite manager 118 can receive sector metrics, such as scheduling data (e.g., grant data, synchronization or timing data), uplink control information, downlink control information, downlink traffic, uplink user data traffic, channel quality information, MIMO parameters (e.g., rank, precoder index), hybrid automatic repeat request feedback data (e.g., acknowledgements or negative acknowledgements of a downlink transmission), other types of sector metrics, or one or more combinations thereof.

In embodiments, satellite manager 118 can continuously receive and store location information of the satellites 120A and 120B. For example, the satellites 120A and 120B transmit location information as the satellites 120A and 120B move along a track having a radius during a flight cycle. In embodiments, satellite manager 118 can determine a flight track of each of the satellites 120A and 120B based on the location information. Satellite manager 118 can also receive, store, and manage weather, climate, and environmental data from satellites 120A and 120B, such as precipitation data, sea surface temperature data, lake surface temperature data, atmospheric temperature data, atmospheric humidity data, volcanic activity data, other types of weather, climate, and environmental data, or one or more combinations thereof.

Satellite manager 118 can also receive location information of cell site 114 and user devices 102A-102C. Satellite manager 118 can also receive communication link data of communication links 116A-116C, communication links 122A and 122B, communication links 124A and 124B, and communication link 126. For example, the communication link data may include beamset data, such as beam direction, beam width (e.g., vertical beam width, azimuthal beam width), beam direction control frequencies, coverage area data, beam horizontal and vertical lobe angle, beamforming weights, antenna data, horizontal and vertical azimuth of a beam, channel state information, electrical tilt, associated antenna characteristics, gains, other types of beamset data, or one or more combinations thereof. The communication link data may include sector metrics associated with one or more of sectors 110A, 110B, and 110C.

The satellite manager 118 may store such data (e.g., the location information of cell site 114, the location information of user devices 102A-102C, location information of the satellites 120A and 120B, weather, climate, and environmental data, other types of data stored at the satellite manager 118, or one or more combinations thereof) based on associated beamset data, associated sector metrics, or one or more combinations thereof. In some embodiments, the satellite manager 118 can communicate stored data to the MME 112, and the MME 112 can communicate the sector metrics to the satellite manager 118.

In embodiments, cell site 114 or one of the satellites 120A or 120B can receive at least one sector metric associated with one or more of sector 110A, sector 110B, and sector 110C of the wireless telecommunication network utilizing mmWave communication. The at least one sector metric includes beamset data corresponding to the sector 110A (e.g., the alpha sector). For example, UE manager 108, MME 112, cell site 114, satellite manager 118, and satellites 120A and 120B can receive sector metrics associated with one or more of sector 110A, sector 110B, and sector 110C from one or more of user devices 102A-102C. For instance, the UE manager 108, MME 112, cell site 114, satellite manager 118, and satellites 120A and 120B can receive sector metrics associated with the sector 110A from user device 102A (e.g., based at least in part on utilizing communication links 116A and 124A).

In embodiments, the sector metrics received from one or more of user devices 102A-102C may comprise reported beamset data including one or more of measurement reference signals, channel state information reference signals of one or more beams of a beamset, primary synchronization signals, secondary synchronization signals, channel quality associated with a beam sweep, beamset data associated with uplink signals, other types of beamset data, or one or more combinations thereof. In one embodiment, user device 102A is connected to the wireless telecommunication network via multiple Tx/Rx points (e.g., via cell site 114 and satellite 120B) and multiple beams for each Tx/Rx point. Continuing the example, a first set of beamset data corresponding to the beamset from cell site 114 and a second set of beamset data corresponding to the beamset from satellite 120B can each include a received signal strength of one or more of the beams associated with each beamset.

In embodiments, the cell site 114 can receive at least one sector metric (associated with one or more of sector 110A, sector 110B, and sector 110C of the wireless telecommunication network) from one of the satellites 120A or 120B. Satellites 120A and 120B can also receive at least one sector metric from cell site 114. For example, the sector metrics can include sector loading data (e.g., loading patterns, a number of user devices associated with a frequency band, a data transmission volume associated with a frequency band, historic numbers of user devices associated with a frequency band, historic data transmission volumes), time domain, frequency domain, power domain technique data, carriers, time slots, transmit power levels, SINR associated with one or more carriers corresponding to a sector, sector and carrier mappings to data rates, sector location data, frequency band location data, radio frequency environment of a sector, sector-edge location data, sector interference data, scheduling delay data, current radio frequency fingerprint data, historic radio frequency fingerprint data, signal amplitude, signal phase, sector frequencies, other types of sector metrics, or one or more combinations thereof. The sector metrics can also include beamset data for one or more beamsets associated with a sector, such as a target beam identifier; a beamset switch time associated subframes, slots, mini-slots (e.g., specifying a subframe, slot, or mini-slot identifier or an offset); channel quality associated with a beam sweep; a number of user devices associated with a particular beam within the beamset; a number of user devices associated with a beamset; analog or digital beamforming capabilities; beamforming type; antenna direction associated with one or more beams of the beamset; other timing information; other beamforming configuration data; other beamset data; or one or more combinations thereof.

In embodiments, the sector metrics corresponding to sector 110A can be stored at a primary-secondary cell and a special cell of sector 110B. Additionally or alternatively, the sector metrics corresponding to sector 110B can be stored at a primary-secondary cell and a special cell of sector 110A. Further, the sector metrics corresponding to sector 110C can be stored at the primary-secondary cell and special cell of sector 110B and the primary-secondary cell and special cell of sector 110A. The sector metrics corresponding to sectors 110A and 110B can also be stored at the primary-secondary cell and special cell of sector 110C. As such, the cell site 114 or the satellites 120A and 120B can change a beamset corresponding to sector 110B based on the sector metric stored at the primary-secondary cell and special cell of sector 110B. Additionally, the cell site 114 or the satellites 120A and 120B can change a beamset corresponding to sector 110A based on the sector metric stored at the primary-secondary cell and special cell of sector 110A. Further, the cell site 114 or the satellites 120A and 120B can change a beamset corresponding to sector 110C based on the sector metric stored at the primary-secondary cell and special cell of sector 110C.

In some embodiments, a change to a beamset may include changing a frequency range of one or more beams of the beamset, corresponding to the sector 110B for example, from a sub-6 GHz band to an mmWave band. In some embodiments, the change to the beamset may include changing a frequency range of the one or more beams from one mmWave band to another mmWave band. In this example, the change can include maintaining the mmWave communication with one or more user devices within the second sector. In another example, the changed frequency range is from one near-mmWave band to the mmWave band. In some embodiments, the change is to a beamset corresponding to the cell site 114. For example, the change to the beamset may correspond to one or more macro cells, one or more small cells, one or more relay base stations, one or more repeaters, one or more femtocells, other types of cells, or one or more combinations thereof, associated with the cell site 114. In some embodiments, the change is to a beamset corresponding to the satellites 120A and 120B. Continuing the example, the satellite 120A or 120B that changes the beamset is a space satellite, a balloon, a dirigible, an airplane, a drone, an unmanned aerial vehicle, another type of satellite, or one or more combinations thereof, wherein the satellite 120A or 120B is in a geosynchronous or geostationary earth orbit, a low earth orbit, a medium earth orbit, another type of orbit, or one or more combinations thereof.

In some embodiments, the change to the beamset may include a change in direction to one or more of the beams of the beamset. In some embodiments, the change to the beamset may include a change to a phase offset. In some embodiments, the change to the beamset may include using a digital-to-analog converter, a phase shifter, a splitter, another transmission component, or one or more combinations thereof. In some embodiments, the change to the beamset may include a change to the main lobe or a change to a side lobe of the beamset, thereby resulting in a change to the beam pattern of the beamset. In some embodiments, the change to the beamset may include a change to a bandwidth associated with the beamset (e.g., from the 30 GHz band, or higher, which may be referred to as frequency range 2 (FR2), to a relatively low frequency band that is less than 6 GHz, which may be referred to as sub-6 communications or frequency range 1 (FR1)). In some embodiments, the change to the beamset may include may include applying, via a user device 102A-102C, cell site 114, or satellites 120A-120B, one or more amplitude or phase offsets to signals carried via each of the antenna elements associated with the cell site 114 or satellites 120A or 120B. Continuing the example, the adjustments associated with the antenna elements may be defined by a beamforming weight set associated with a particular orientation (e.g., with respect to the antenna array of the cell site 114 or satellites 120A or 120B or the user devices 102A-102C, or with respect to some other orientation).

In some embodiments, the change to the beamset is determined based on applying one or more machine learning algorithms to the sector metrics stored at the primary-secondary cell and special cell of one or more of sectors 110A, 110B, and 110C, or additional sector metrics received at a subsequent time. For example, one or more processors associated with cell site 114 or satellites 120A and 120 can use one or more machine learning algorithms that learn over time based on historic sector metrics and additionally received sector metrics that correspond to one or more of sectors 110A, 110B, and 110C. In some embodiments, machine learning and a neural network can both be used to update the learned algorithm and apply a model for beam management of the beams of each of the beamsets corresponding to the cell site 114 or the satellites 120A and 120B. In some embodiments, the one or more machine learning algorithms use centralized training data associated with one database. In other embodiments, the one or more machine learning algorithms use multiple devices (e.g., MME 112 and satellite manager 118) to collaboratively learn and to form the model for beam management of the beams of each of the beamsets corresponding to the cell site 114 or the satellites 120A and 120B.

Figure 2:
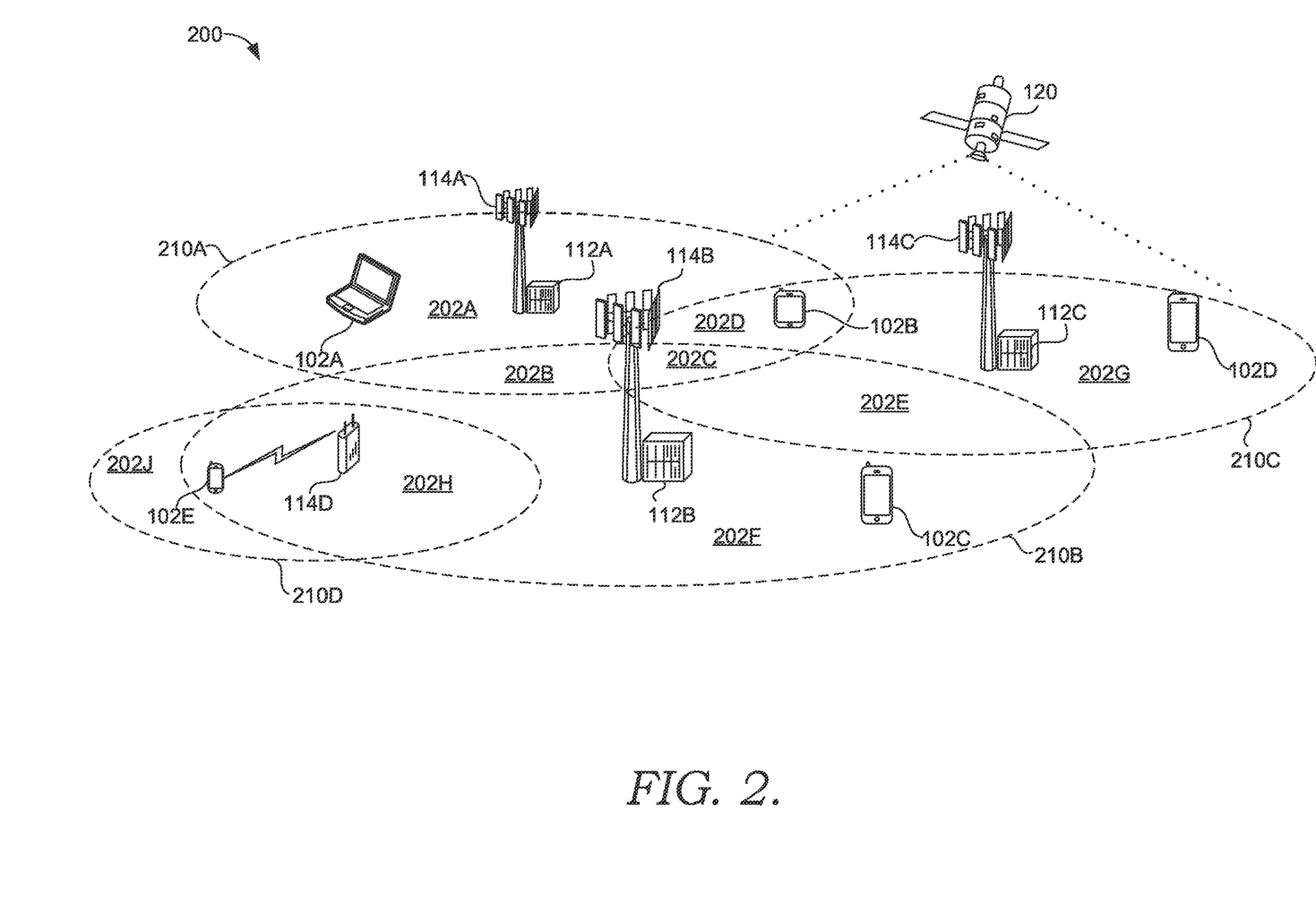
FIG. 2 depicts another example operating environment for sector beamset management in a wireless telecommunication network utilizing mmWave communication, in accordance with aspects herein.

FIG. 2 comprises example environment 200 including user devices 102A-102E, coverage areas 210A-210D, MMEs 112A-112C, cell site 114A-114D, satellite 120, and coverage area portions 202A-202J. The coverage area portions in example environment 200 are as follows: coverage area portion 202A without overlap with coverage areas 210B and 210C, coverage area portion 202B having overlap with coverage areas 210A and 210B, coverage area portion 202C having overlap with coverage areas 210A, 210B and 210C, coverage area portion 202D having overlap with coverage areas 210A and 210C, coverage area portion 202E having overlap with coverage areas 210B and 210C, coverage area portion 202F without overlap with coverage areas 210A and 210C, coverage area portion 202G without overlap with coverage areas 210A and 210B, coverage area portion 202H having overlap with coverage area 210B, and coverage area portion 202J without overlap with coverage area 210B.

In embodiments, sector metrics corresponding to one or more of coverage areas 210A-210D (including sector metrics corresponding to coverage area portions 202A-202J) can be stored at one or more primary-secondary cell and special cell of one or more of coverage areas 210A-210D. In one example, sector metrics corresponding to coverage area portion 202A can be stored at the primary-secondary cell and special cell associated with coverage area portion 202B. As such, one or more of the cell sites 114A-114D or the satellite 120 can change one or more beamsets corresponding to one or more of coverage areas 210A-210D or one or more of coverage area portions 202A-202J based on the sector metrics stored at the primary-secondary cell and special cell (e.g., corresponding to a sector of a coverage area).

In embodiments, the cell site 114 or satellite 120 can identify one or more overlapping areas associated with one or more of coverage areas 210A-210D, such as one or more of coverage area portions 202B-202D and 202H, for example. For instance, MMEs 112A-112C can identify a connection request from user devices (e.g., a drone specific PDN connection) within the one or more of coverage area portions 202B-202D and 202H. One or more of MMEs 112A-112C may subsequently transmit the connection request to one or more of cell sites 114A-114D associated with the corresponding coverage area portion 202B-202D or 202H that the connection request came from. For example, MME 112C may transmit the connection request to cell site 114C and satellite 120. In addition to transmitting the connection request, MMEs 112A-112C can also transmit stream control transmission protocol (e.g., to cell site 114C).

Further, one or more user devices within the one or more of coverage area portions 202B-202D and 202H can measure received signal power from one or more of cell sites 114A-114C. For example, one or more user devices within coverage area portion 202B can measure received signal power from cell sites 114A and 114B. As such, one or more devices within example environment 200 can determine whether coverage area 210A or coverage area 210B associated with coverage area portion 202B has a stronger signal than the other. Based on determining that the coverage area 210A has the stronger signal, cell site 114A can provide a downlink beam to the user device within the coverage area portion 202B via a changed beamset of coverage area 210A (the change to the beamset being based on sector metrics stored at a primary-secondary cell and special cell of a sector corresponding to coverage area 210A).

Continuing the example, the one or more user devices within coverage area portion 202B can continuously measure received signal power from cell sites 114A and 114B. Based on these continuous measurements and based on continuously storing sector metrics corresponding to coverage areas 210A-210B at one or more primary-secondary cell and special cell of one or more sectors within coverage areas 210A-210B, example environment 200 can determine subsequent changes to one or more beamsets of coverage areas 210A-210B. As such, these beamsets can be dynamically changed (e.g., for providing a downlink beam to the user device within coverage area portion 202B based on one or more additional beamset changes).

Figure 3:
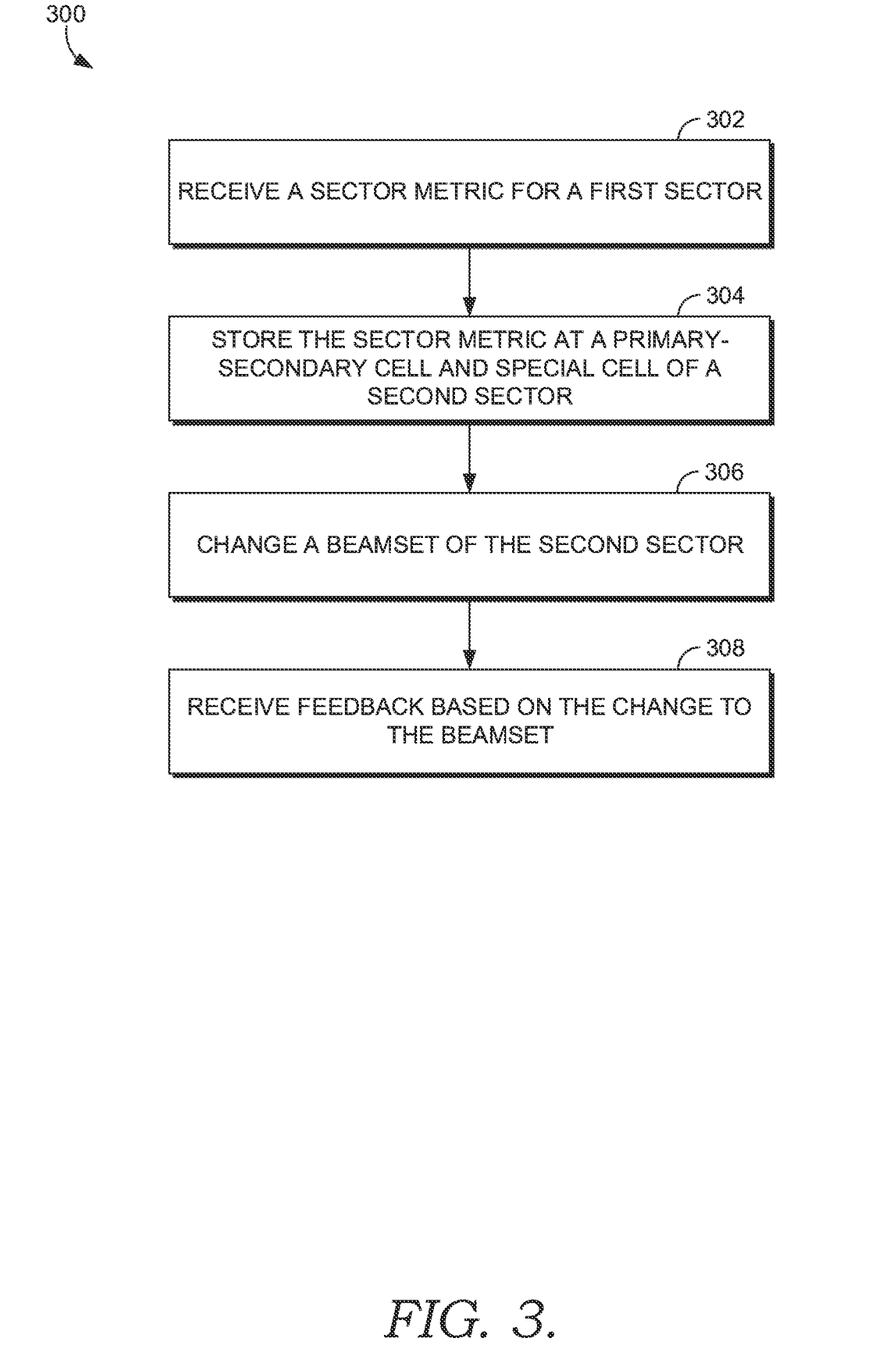
FIG. 3 depicts an example flowchart for improved sector beamset management, in accordance with aspects herein.

FIG. 3 depicts example flowchart 300 for improved sector beamset management. At 302, the method includes receiving at least one sector metric for a first sector of the wireless telecommunication network utilizing an mmWave communication. The at least one sector metric includes beamset data corresponding to the first sector. In some embodiments, the method also includes receiving sector metrics for a second sector of the wireless telecommunication network utilizing the mmWave communication. In some embodiments, the method also includes receiving sector metrics for a third sector of the wireless telecommunication network utilizing the mmWave communication. In some embodiments, the method also includes receiving sector metrics for one or more sectors associated with a different coverage area than the first, second, and third sectors. In some embodiments, sector metrics are received for different coverage areas, for one or more coverage area portions, or one or more combinations thereof.

The devices of the wireless telecommunication network, in some embodiments, include one or more cell sites, one or more satellites, or one or more combinations thereof, having antenna elements for providing the mmWave communication (e.g., using beamforming). In some embodiments, the one or more cell sites, one or more satellites, or one or more combinations thereof, transmit the mmWave signals to one or more mmWave repeaters that amplify the analog mmWave signals, thereby transmitting the amplified mmWave signals to user devices. In some embodiments, the one or more cell sites, one or more satellites, or one or more combinations thereof, transmit the mmWave signals to one or more wireless transmit receive points, which can also amplify the mmWave signals and transmit them to the user devices. In some embodiments, the mmWave communications are transmitted based on one or more beamforming codebooks that have a plurality of beamforming configurations associated with mmWave signal transmitting components (e.g., the one or more cell sites, one or more satellites, wireless backhaul communications between a cell site and another device).

At 304, the sector metrics (e.g., received by a cell site or satellite and associated with one or more sectors of a first coverage area or one or more sectors of another coverage area) are stored at one or more primary-secondary cell and special cell of one or more sectors of one or more coverage areas. For example, sector metrics for a first sector of a coverage area of the wireless telecommunication network can be stored at the primary-secondary cell and special cell of a second sector or a third sector of the coverage area. Continuing the example, the sector metrics for the second sector can be stored at the primary-secondary cell and special cell of the first sector or the third sector. Additionally, the sector metrics for the third sector can be stored at the primary-secondary cell and special cell of the first sector or the second sector. In some embodiments, sector metrics for a portion of overlapping coverage areas can be stored at the primary-secondary cell and special cell of one or more sectors of each corresponding coverage area.

At 306, at least one antenna, at least one antenna array, or one or more antenna elements can change, or be caused to change, a beamset corresponding to the second sector based on the stored sector metrics at the primary-secondary cell and special cell of the second sector. In some embodiments, the change to the beamset is based on the sector metrics of the first sector or the third sector. In some embodiments, the change to the beamset is based on sector metrics for the portion of overlapping coverage areas. In some embodiments, the change to the beamset is based on a frequency range corresponding to the second sector from a sub-6 GHz band to an mmWave band. In one embodiments, a second beamset corresponding to the first sector is changed based on the sector metrics stored at the primary-secondary cell and special cell of the first sector, the stored sector metrics corresponding to the third sector and the second sector. In another embodiment, a third beamset corresponding to the third sector is changed based on the sector metrics stored at the primary-secondary cell and special cell of the third sector, the stored sector metrics corresponding to the first sector and the second sector. In some embodiments, a change to one of the beamsets is based on stored sector metrics corresponding to another cell site.

At 308, feedback is received based on a change to a beamset, and that feedback can be used to further adjust the beamset. For example, additional sector metrics can be received for the first sector, the second sector, and the third sector; and an antenna array or antenna elements can adjust the beamset based on applying one or more machine learning algorithms to the additional sector metrics received. In some embodiments, those additional sector metrics are also stored at a primary-secondary cell and special cell of the associated sector (e.g., stored using MME 112 of FIG. 1). In some embodiments, one or more changes to one or more beamsets can include maintaining an mmWave communication with one or more user devices within the associated sector.

Figure 4:
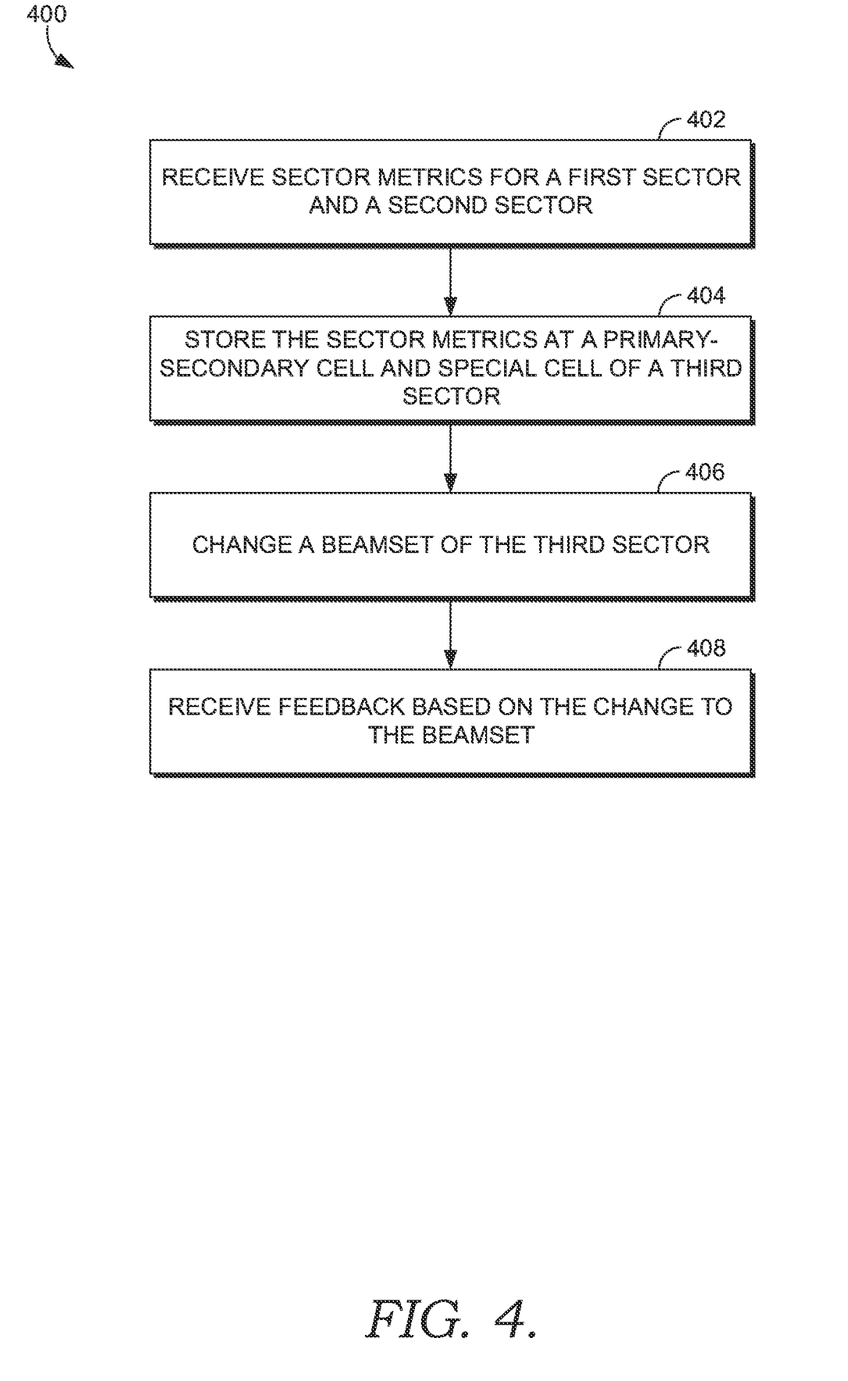
FIG. 4 illustrates another example flowchart for improved sector beamset management, in accordance with aspects herein.

FIG. 4 depicts example flowchart 400 for improved sector beamset management. At 402, the method includes receiving sector metrics for a first sector and a second sector of the wireless telecommunication network utilizing an mmWave communication. At 404, the sector metrics are stored at a primary-secondary cell and special cell of a third sector. In some embodiments, the third sector is associated with the same coverage area as the first and second sector. In some embodiments, sector metrics corresponding to the third sector are also stored at the primary-secondary cell and the special cell of the first and second sector. In some embodiments, sector metrics include data transmission volumes corresponding to one or more sectors and a number of user devices corresponding to the one or more sectors. In some embodiments, the sector metrics corresponds to an mmWave band. In some embodiments, the sector metrics corresponds to a sub-6 GHz band.

At 406, a beamset corresponding to the third sector is changed based on the stored sector metrics. In some embodiments, the change is made based on applying one or more machine learning algorithms to the sector metrics stored at the primary-secondary cell and the special cell of the third sector. In some embodiments, an overlapping area of another sector with the third sector is identified. Continuing the example, it is determined that the third sector has a stronger signal than the other overlapping sector, and a downlink beam is provided to a user device within the overlapping area via the changed beamset of the third sector. At 408, feedback is received based on the change. Continuing the example, the beamset corresponding to the third sector may be adjusted subsequent to the change based on applying one or more machine learning algorithms to additional sector metrics received and stored at the primary-secondary cell and the special cell of the third sector.

Example User Device

Having described the example embodiments discussed above of the presently disclosed technology, an example operating environment of an example user device (e.g., user device 102A of FIG. 1) is described below with respect to FIG. 5. User device 500 is but one example of a suitable computing environment, and is not intended to suggest any particular limitation as to the scope of use or functionality of the technology disclosed. Neither should user device 500 be interpreted as having any dependency or requirement relating to any particular component illustrated, or a particular combination of the components illustrated in FIG. 5.

Figure 5:
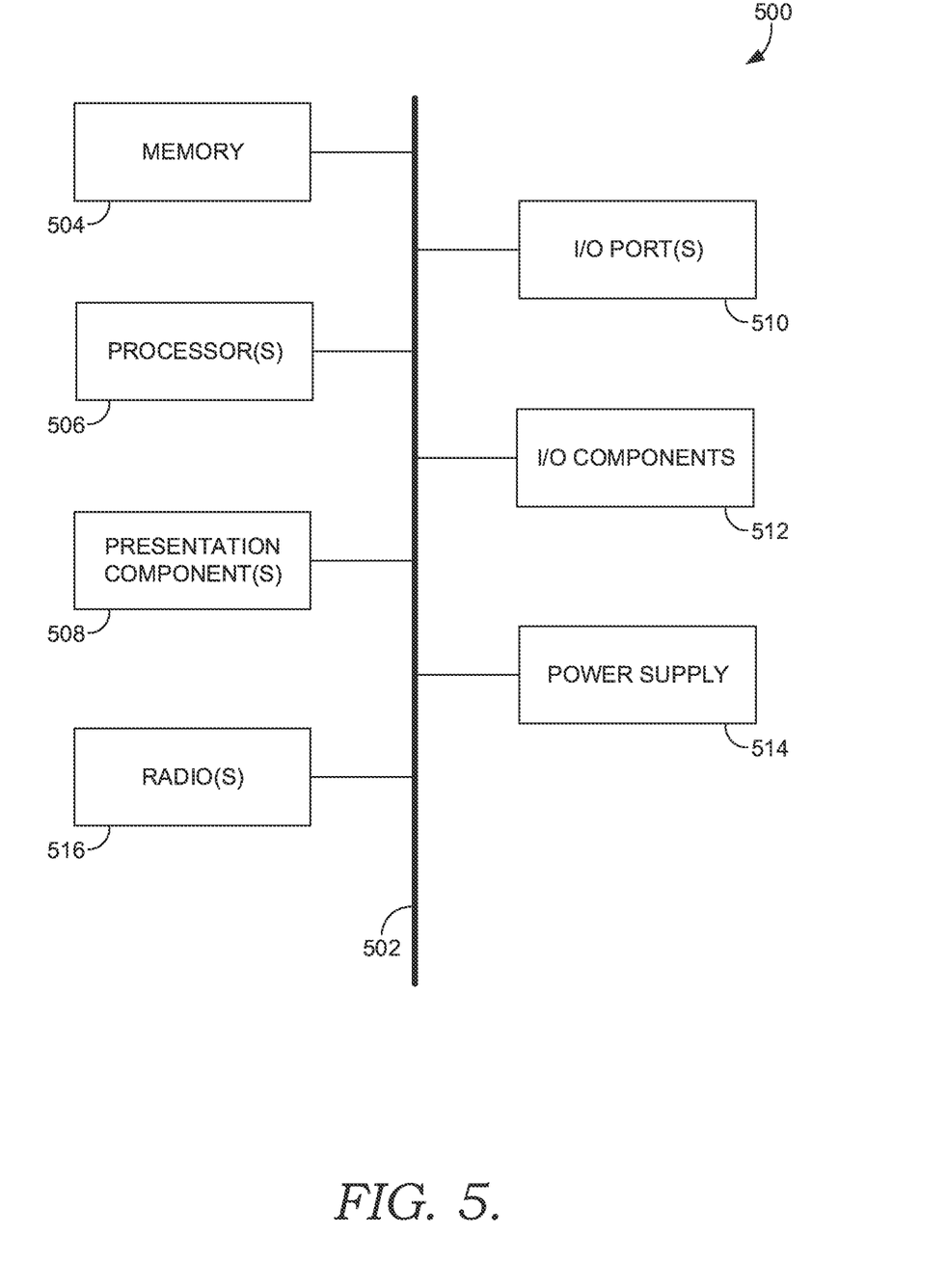
FIG. 5 depicts an exemplary computing environment suitable for use in implementations of the present disclosure, in accordance with aspects herein.

As illustrated in FIG. 5, example user device 500 includes a bus 502 that directly or indirectly couples the following devices: memory 504, one or more processors 506, one or more presentation components 508, one or more input/output (I/O) ports 510, one or more I/O components 512, a power supply 514, and one or more radios 516.

Bus 502 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component, such as a display device, to be an I/O component. Also, processors have memory. Accordingly, FIG. 5 is merely illustrative of an exemplary user device that can be used in connection with one or more embodiments of the technology disclosed herein.

User device 500 can include a variety of computer-readable media. Computer-readable media can be any available media that can be accessed by user device 500 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 504 includes computer storage media in the form of volatile and/or nonvolatile memory. The memory 504 may be removable, non-removable, or a combination thereof. Example hardware devices of memory 504 may include solid-state memory, hard drives, optical-disc drives, other hardware, or one or more combinations thereof. As indicated above, the computer storage media of the memory 504 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 500, or one or more combinations thereof.

The one or more processors 506 of user device 500 can read data from various entities, such as the memory 504 or the I/O component(s) 512. The one or more processors 506 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 506 can execute instructions, for example, of an operating system of the user device 500 or of one or more suitable applications.

The one or more presentation components 508 can present data indications via user device 500, another user device, or a combination thereof. Example presentation components

508 may include a display device, speaker, printing component, vibrating component, another type of presentation component, or one or more combinations thereof. In some embodiments, the one or more presentation components 508 may comprise one or more applications or services on a user device, across a plurality of user devices, or in the cloud. The one or more presentation components 508 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof. For example, the one or more presentation components 508 can present a visualization that compares a plurality of inspections of one or more cores of a central processing unit and a visualization of each task of each of the plurality of inspections.

The one or more I/O ports 510 allow user device 500 to be logically coupled to other devices, including the one or more I/O components 512, some of which may be built in. Example I/O components 512 can include a microphone, joystick, game pad, satellite dish, scanner, printer, wireless device, and the like. The one or more I/O components 512 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 508 on the user device 500. In some embodiments, the user device 500 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 500 may, additionally or alternatively, be equipped with accelerometers or gyroscopes that enable detection of motion. In some embodiments, the output of the accelerometers or gyroscopes may be provided to the one or more presentation components 508 of the user device 500 to render immersive augmented reality or virtual reality.

The power supply 514 of user device 500 may be implemented as one or more batteries or another power source for providing power to components of the user device 500. In embodiments, the power supply 514 can include an external power supply, such as an AC adapter or a powered docking cradle that supplements or recharges the one or more batteries. In aspects, the external power supply can override one or more batteries or another type of power source located within the user device 500.

Some embodiments of user device 500 may include one or more radios 516 (or similar wireless communication components). The one or more radios 516 can transmit, receive, or both transmit and receive signals for wireless communications. In embodiments, the user device 500 may be a wireless terminal adapted to receive communications and media over various wireless networks. User device 500 may communicate using the one or more radios 516 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 516 may facilitate communication via radio frequency signals, frames, blocks, transmission streams, packets, messages, data items, data, another type of wireless communication, or one or more combinations thereof. The one or more radios 516 may be capable of transmitting, receiving, or both transmitting and receiving wireless communications via mmWaves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for sector beamset management in a wireless telecommunication network utilizing millimeter wave (mmWave) communication, the system comprising:
   at least one cell site having one or more antennas, the at least one cell site associated with the wireless telecommunication network utilizing the mmWave communication;
   one or more processors associated with the at least one cell site; and
   computer memory storing computer-usable instructions that, when executed by the one or more processors, perform operations comprising:
   receiving at least one sector metric for a first sector of the wireless telecommunication network utilizing the mmWave communication, wherein the at least one sector metric includes beamset data corresponding to the first sector;
   storing the beamset data at a primary-secondary cell and a special cell of a second sector;
   causing at least one antenna of the one or more antennas to change a beamset corresponding to the second sector based on the stored beamset data;
   receiving sector metrics for a third sector of the wireless telecommunication network utilizing the mmWave communication; and
   storing the sector metrics at the primary-secondary cell and the special cell of the second sector, wherein the change to the beamset is further based on the stored sector metrics for the third sector.

2. The system according to claim 1, the operations further comprising causing the at least one antenna to change a frequency range corresponding to the second sector from a sub-6 GHz band to an mmWave band based on the stored beamset data and the stored sector metrics.

3. The system according to claim 1, the operations further comprising:
   receiving second sector metrics for the second sector;
   storing the second sector metrics for the second sector and the sector metrics for the third sector at a primary-secondary cell and a special cell of the first sector; and
   causing a second antenna of the one or more antennas to change a second beamset corresponding to the first sector based on the sector metrics for the third sector and the second sector metrics for the second sector.

4. The system according to claim 3, the operations further comprising:
   storing the at least one sector metric for the first sector and the second sector metrics of the second sector at a primary-secondary cell and a special cell of the third sector; and
   causing the at least one antenna to change a third beamset corresponding to the third sector based on the stored beamset data and the second sector metrics.

5. The system according to claim 1, the operations further comprising:
   receiving a plurality of additional sector metrics for the first sector, the second sector, and the third sector, the plurality of additional sector metrics including a number of user devices;
   identifying a particular beamset by applying one or more machine learning algorithms to the plurality of additional sector metrics; and
   causing the at least one antenna to change the beamset corresponding to the second sector to the identified particular beamset.

6. The system according to claim 1, the operations further comprising:
   receiving sector metrics for a sector corresponding to a second cell site of the wireless telecommunication network utilizing the mmWave communication; and
   storing the sector metrics corresponding to the second cell site at the primary-secondary cell and the special cell;
   wherein the change to the beamset is further based on the stored sector metrics corresponding to the second cell site.

7. The system according to claim 1, wherein the second sector is a gamma sector of the at least one cell site.

8. A method for sector beamset management in a wireless telecommunication network utilizing millimeter wave (mmWave) communication, the method comprising:
   receiving sector metrics for a plurality of sectors of the wireless telecommunication network utilizing the mmWave communication, the sector metrics including beamset data;
   storing the sector metrics at a primary-secondary cell and a special cell of one or more of the plurality of sectors;
   causing at least one antenna of the of the wireless telecommunication network to change a beamset corresponding to the one or more of the plurality of sectors based on the stored sector metrics; and
   identifying an overlapping area of a first sector and a second sector of the plurality of sectors;
   determining the first sector has a stronger signal than the second sector; and
   providing a downlink beam to a user device within the overlapping area via the changed beamset of the first sector.

9. The method according to claim 8, wherein the sector metrics are received from a first plurality of user devices within a first set of the plurality of sectors, the first set corresponding to a first cell site, and wherein the sector metrics are received from a second plurality of user devices within a second set of the plurality of sectors, the second set corresponding to a second cell site.

10. The method according to claim 9, wherein at least one of the sector metrics received from the first plurality of user devices corresponds to an mmWave band, and wherein at least one of the sector metrics received from the first plurality of user devices corresponds to a sub-6 GHz band.

11. The method according to claim 10, wherein the sector metrics include data transmission volumes corresponding to each of the plurality of sectors and a number of user devices corresponding to each of the plurality of sectors.

12. The method according to claim 8, wherein storing the sector metrics at the primary-secondary cell and the special cell includes storing the sector metrics corresponding to a first sector and a second sector at the primary-secondary cell and the special cell of a third sector, storing the sector metrics corresponding to the third sector and the second sector at the primary-secondary cell and the special cell of the first sector, and storing the sector metrics corresponding to the first sector and the third sector at the primary-secondary cell and the special cell of the second sector.

13. One or more non-transitory computer storage media having computer-executable instructions embodied thereon, that when executed by at least one processor, cause the at least one processor to perform a method comprising:
  receiving beamset data for a first sector of a wireless telecommunication network utilizing a millimeter wave (mmWave) communication;
  storing the beamset data at a primary-secondary cell and a special cell of a second sector of the wireless telecommunication network, wherein the first sector corresponds to a first antenna array and the second sector corresponds to a second antenna array; and
  causing the second antenna array to change a beamset corresponding to the second sector based on the stored beamset data, wherein the change to the beamset includes maintaining the mmWave communication with user devices within the second sector.

14. The one or more non-transitory computer storage media of claim 13, the method further comprising:
  receiving sector metrics for the first sector and a third sector of the wireless telecommunication network utilizing the mmWave communication; and
  storing the sector metrics at the primary-secondary cell and the special cell of the second sector;
  wherein the change to the beamset is further based on the stored sector metrics for the third sector.

15. The one or more non-transitory computer storage media of claim 14, wherein the change to the beamset is determined based on applying one or more machine learning algorithms to the sector metrics.

16. The one or more non-transitory computer storage media of claim 15, the method further comprising:
  receiving additional sector metrics for the first sector, the second sector, and the third sector; and
  causing the second antenna array to adjust the beamset corresponding to the second sector based on applying the one or more machine learning algorithms to the additional sector metrics.

17. The one or more non-transitory computer storage media of claim 13, the method further comprising:
  receiving sector metrics for a plurality of sectors that each correspond to at least one antenna array; and
  storing the sector metrics at the primary-secondary cell and the special cell of the second sector;
  wherein the change to the beamset is further based on the stored sector metrics for the plurality of sectors.

* * * * *